Feb. 25, 1964 H. HACK 3,122,020
METHOD AND MACHINE FOR BALANCING ROTORS
Filed Sept. 13, 1961 4 Sheets-Sheet 1
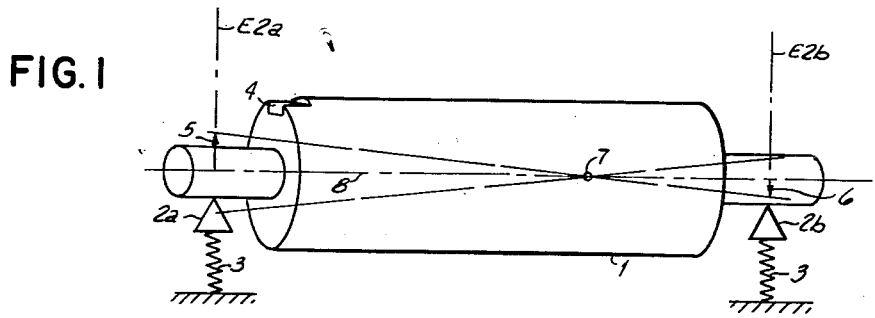
FIG. 1
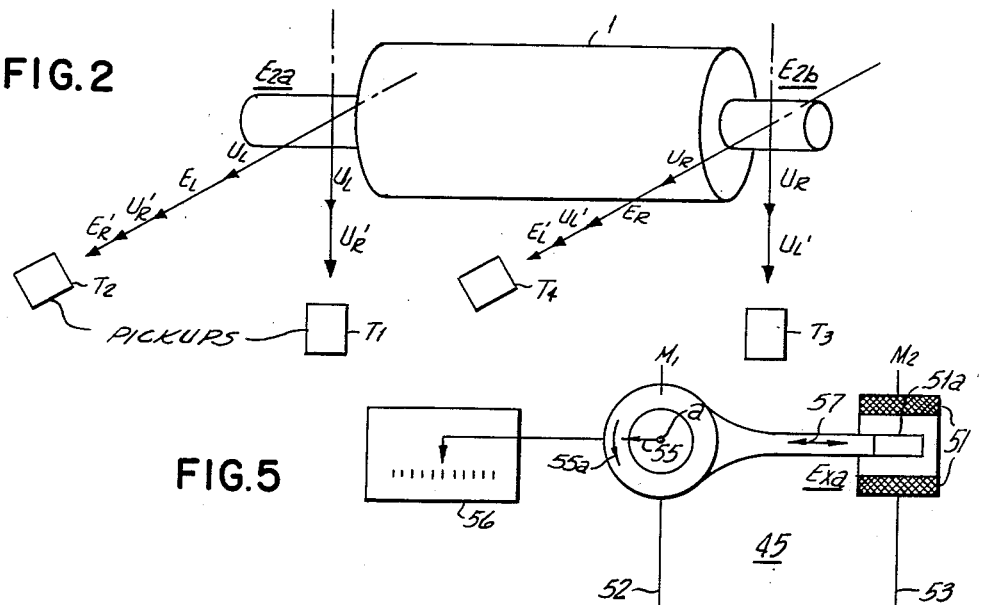
FIG. 2
FIG. 5
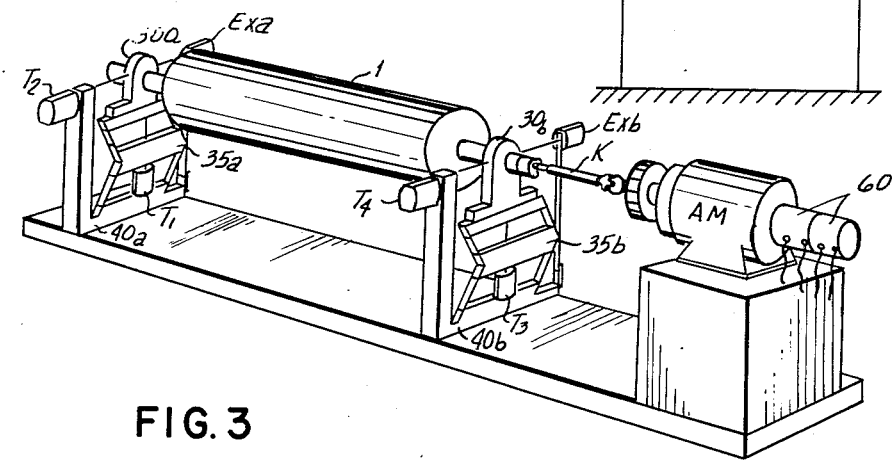
FIG. 3

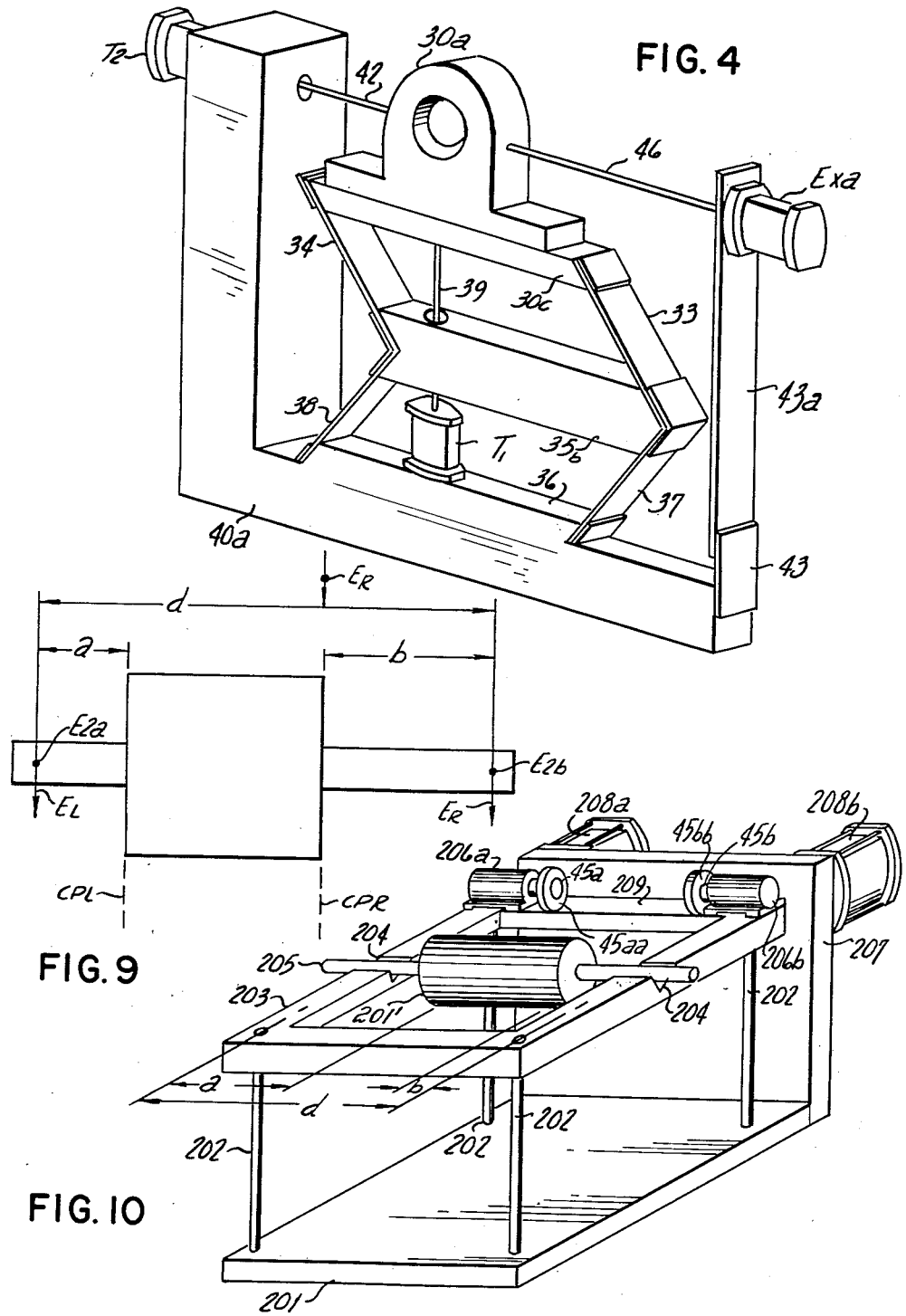

Feb. 25, 1964     H. HACK     3,122,020
METHOD AND MACHINE FOR BALANCING ROTORS
Filed Sept. 13, 1961     4 Sheets-Sheet 4

United States Patent Office 3,122,020
Patented Feb. 25, 1964

3,122,020
METHOD AND MACHINE FOR BALANCING ROTORS
Heinrich Hack, Darmstadt, Germany, assignor to Carl Schenck Maschinenfabrik GmbH, Darmstadt, Germany, a corporation of Germany
Filed Sept. 13, 1961, Ser. No. 137,872
Claims priority, application Germany Sept. 13, 1960
12 Claims. (Cl. 73—462)

My invention relates to methods and machines for determining the unbalance of rotating workpieces and has its general objects to simplify the manipulations to be performed and to shorten the period of time required for calibrating the balance analyzing equipment prior to performing a balance-measuring run proper.

When workpieces (rotors) are tested in a dynamic balancing machine at supercritical speeds of rotation, the unbalance, as a rule, is measured by the oscillatory deflections of the vibratorily mounted bearings or journal supports of the rotor while the rotor is kept in rotation at the testing speed. During the measuring run, the rotor performs a pendulus motion about the gravity center or "node" of its unbalance. As a consequence, an oscillatory deflection of the left rotor support constrainedly causes a simultaneous deflection at the right support. By measuring and comparing the respective magnitudes of these two deflections, the position of the nodal point in the rotor can be accurately determined. This or equivalent knowledge is necessary in order to permit eliminating the mutual influence of the disturbing unbalance forces that are caused at one journal support by the deflections of the other and vice versa, so that it is possible to obtain at each journal, and consequently in each corresponding reference plane, an unbalance measuring result free of residual or disturbing moments due to the deflections in the other plane. Such a "plane separation," originally performed by mechanical devices, is now most often obtained with the aid of an electrical potentiometric network. Reference in this respect may be had, for example, to the book by James B. Hartman, Dynamics of Machinery, published 1956 by McGraw-Hill Book Company Inc., New York, Section 5–11, pages 145 to 150. In most modern machines, the magnitude of the disturbing effects, caused by unbalance in one reference plane upon the measurements made in another reference plane, is first determined by a calibrating run in which a known trial unbalance is attached to the rotor, and in which an electric plane-separation network of the above-mentioned type, for example as more fully described in U.S. Patent 2,165,024, is then adjusted for plane separation. Only after performing such a calibrating run is the equipment ready for measuring the unbalance originally inherent in the rotor.

It has also been proposed to place the workpiece to be tested into the oscillatorily supported bearings of a balancing machine and, without placing the workpiece in rotation, to excite the workpiece to oscillations for the purpose of thus obtaining the calibration required for a correct measuring of inherent unbalance.

It is an object of the present invention to afford correct measuring results, free of residual disturbing moments and without any calibrating run, in a simpler and more expeditious manner than heretofore available, while reliably maintaining the measuring results accurately referred to the bearing planes of the rotor or to preselected rotor locations where a correction of observed unbalance can be favorably effected.

Another object of my invention is to provide for unbalance measuring operations whose accuracy is independent of the rotor speed within a wide range of applicable speeds of rotation. To achieve these objects, and in accordance with a feature of my invention, I subject the workpiece rotor during the unbalance-measuring run to an additional oscillatory motion in superposition to the oscillation caused by the inherent unbalance of the rotor, the additional oscillatory motion being produced by a special excitation of a given magnitude, direction and frequency. As will be more fully set forth below, with reference to Equations 5 and 6, the ratio of the magnitudes of these two respective oscillatory motions, resulting from unbalance of the rotor and from the additional excitation, readily affords an accurate determination of the required magnitude of unbalance correction.

As will also be explained, such determination can be effected with the aid of simple and fully automatic means. It is essential that the invention affords determining or eliminating from the measuring results those factors that affect the unbalance indication, particularly the mass and the mass inertia moment, and that the unbalance magnitudes or the required amounts of balance correction become directly recognizable without auxiliary manipulation, and furthermore that the dimensional unit to be employed for measuring the unbalance (for example cm.-g. or g.) can be chosen as may be desired by adjusting the frequency and amplitude of the oscillations generated by one or more exciters.

According to another feature of my invention, I provide a balancing machine for performing the above-described method with journal means for rotatably receiving the workpiece that are capable of performing oscillations in vertical as well as in horizontal directions of a reference plane or journal plane; and I provide this machine in each of these planes with two transducers, such as electric pickups, which respond to oscillations in two coordinate, preferably 90° displaced, directions respectively, one of these two directions being coincident with the direction of the superimposed excitation. One of the transducers thus translates the oscillations into an electric voltage due to the sum of the oscillations caused by rotor unbalance plus those caused by superimposed excitation, whereas the other pickup furnishes a voltage due only to rotor unbalance. I further provide a source of phase-reference voltage in synchronism and fixed phase with the rotation of the workpiece, and connect the three voltages with electric computer-type means which form a resultant voltage indicative of the rotor unbalance to be measured.

The invention, including its theoretical principles as well as examples of balancing machines embodying these principles, will be described with reference to the accompanying drawings in which:

FIGS. 1 and 2 are explanatory diagrams showing in schematic perspective a rotor and indicating diagrammatically certain conditions obtaining in the oscillatingly supported bearings of a balancing machine in which the rotor is journalled.

FIG. 3 is a schematic perspective view of a balancing machine according to the invention.

FIG. 4 shows schematically and in perspective one of the bearing structures of the same machine.

FIG. 5 is a schematic diagram of an auxiliary electromagnetic exciter applicable in a machine according to FIGS. 3 and 4.

FIG. 9 is an explanatory diagram relating to another embodiment of a balancing machine according to the invention; and FIG. 10 is a schematic perspective view of the latter embodiment, the illustration being substantially limited to those features that differ from the embodiment of FIGS. 3 to 6.

Figure 6:
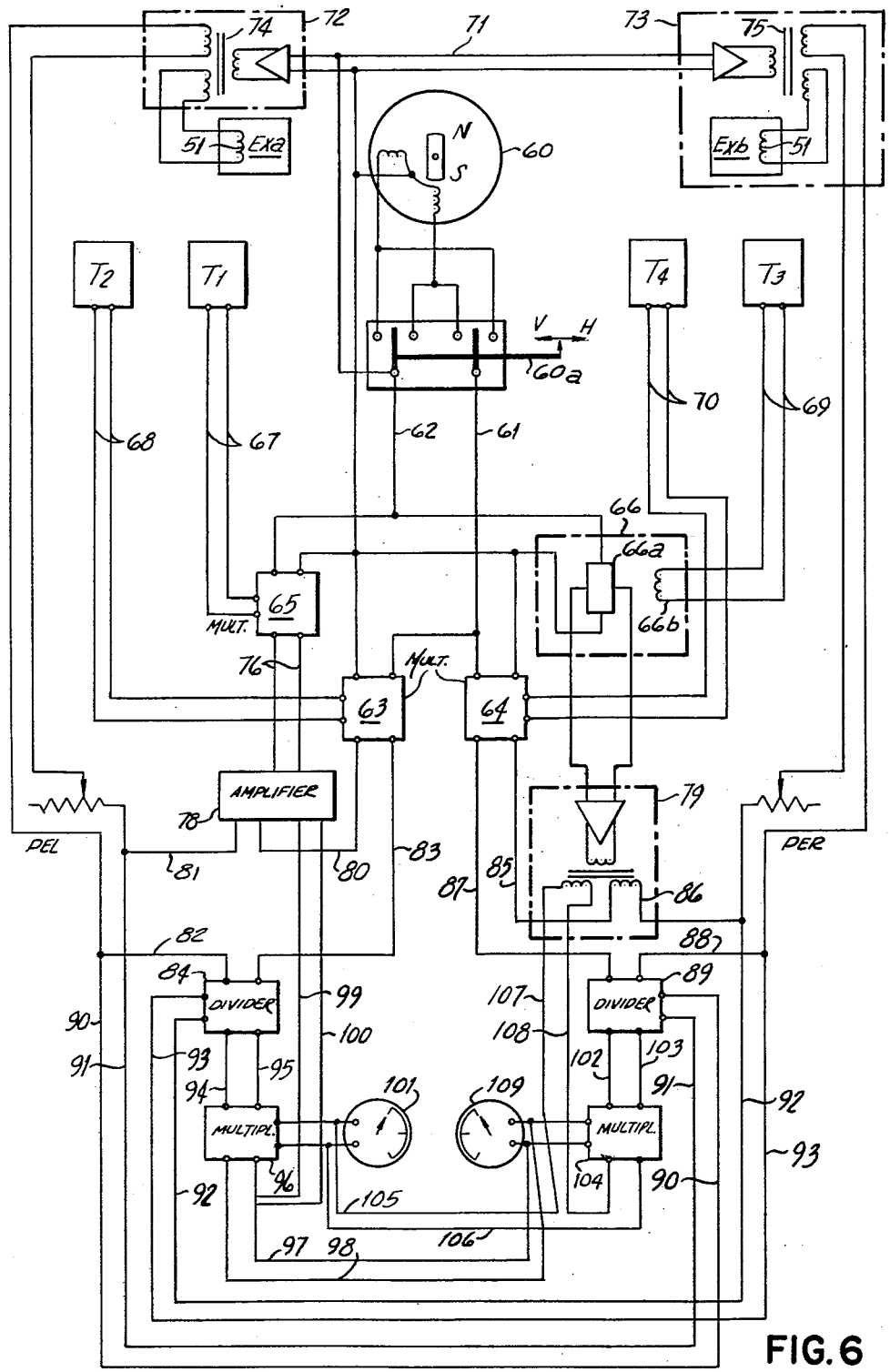
FIG. 6 is a schematic circuit diagram of the electric balance analyzing equipment of which the machine according to FIGS. 3 to 5 forms part.

According to FIG. 1, a roller-shaped rotor 1 has its two shaft ends journalled in respective bearings schematically indicated at 2a and 2b. As a rule, the bearings in balncing machines for operation at supercritical speeds of workpiece rotation are oscillatingly mounted, for example by means of springs as schematically shown at 3, and the spring constants are so chosen that the natural frequency of each bearing is below the measuring frequency of the rotor. During the measuring run an unbalance 4 of the rotor 1 in the bearing plane E2a may produce a deflection of a given magnitude, schematically represented by an arrow 5. The same unbalance will then produce a simultaneous deflection 6 of smaller magnitude and opposed direction in the other bearing plane E2b. The geometric line connecting the points of the two unbalance vectors 5 and 6 intersects the rotational axis 8 of the workpiece 1 at point 7 which remains at rest during rotation of the rotor. The location of this oscillation center point or node depends upon the position of the point of attack of the unbalance 4 on the rotor.

FIG. 2 serves to schematically indicate the force vectors which act upon the rotor bearings 1 in the two planes E2a and E2b. These vectors may be represented by electric voltage values as is generally the case in electrically operating balancing machines. As mentioned, during a measuring run of a rotor piece being tested in accordance with my invention, the rotor bearings are subjected to unbalance-responsive forces as well as to forces stemming from a superimposed linear excitation, such as may be generated, for example, by an exciter as described hereinafter with reference to FIGS. 4 and 5.

Now, according to FIG. 2, there are active at the left and right bearing in the respective planes E2a and E2b, not only the vectorial force components $U_L$ and $U_R$ of the unbalance forces to be accurately determined, but also the force vectors $E_L$ and $E_R$ caused by the additional excitation. The vectors $E_L$ and $E_R$, however, are known, that is, they have a given magnitude, and a given direction in the left and right bearing planes respectively. Also active are force vectors $U_L'$ and $U_R'$. These are the magnitudes of those unbalance-responsive forces which, according to the explanations presented above with reference to FIG. 1, occur at each bearing as a result of an unbalance effect at the other bearing. Thus the vector $U_L$ in plane E2a causes the vector $U_L'$ to occur in plane E2b, and the vector $U_R$ in plane E2a causes the vector $U_R'$ to occur in plane E2a. $E_L'$ and $E_R'$ are the corresponding effects caused by the additional excitation of given magnitude and direction.

The respective magnitudes of these vectors are translated in the conventional manner, for example by transducers such as electrodynamic oscillation pickups T1, T2, T3 and T4, into corresponding electric voltages. The transducer T1, as more fully explained below with reference to FIGS. 3, 4 and 6, furnishes a voltage (hereinafter referred to as voltage "T1") which is proportional to the sum of voltage vectors $U_L$ and $U_R'$. The transducer T2 furnishes a voltage (also referred to as voltage "T2") proportional to the sum of the voltage vectors $$U_L + E_L + U_R' + E_R'.$$

Analogously, transducer T3 provides voltage corresponding to the sum of $U_R + U_L$; and transducer T4 a voltage corresponding to the sum of $U_R + E_R + U_L' + E_L'$. When the voltage generated by transducer T1 is subtracted from the voltage of transducer T2, and if one proceeds in the same manner for the voltages of transducers T3 and T4, each time under consideration of the existing phase positions, the resultant subtractive value, from the measuring viewpoint, is as if the rotating workpiece is free of unbalance. This subtraction can be expressed mathematically by:

(1) $\quad U_L + E_L + U_R' + E_R' - (U_L + U_R') = E_L + E_R'$ and (2) $\quad U_R + E_R + U_L' + E_L' - (U_R + U_L') = E_R + E_L'$ It will be recognized that by the above-described electrical combination or computation of voltages an unbalance-free run can be simulated so that no calibrating run of the workpiece rotor and no use of temporarily added trial weights is needed. Furthermore, since the vectors $E_L$ and $E_R$ correspond to the pre-adjusted excitation force so that their magnitudes are known, the voltage values T1 to T4 can now be introduced as measuring magnitudes, to obtain the following equations:

(3) $\quad T2 - T1 - E_L = E_R'$ and (4) $\quad T4 - T3 - E_R = E_L'$

Since (5) $\quad U_L : U_L' = E_L : E_L'$ and (6) $\quad U_R : U_R' = E_R : E_R'$ it follows that:

(7) $\quad U_L = U_L' \cdot \dfrac{E_L}{E_L'}$ and (8) $\quad U_R = U_R' \cdot \dfrac{E_R}{E_R'}$ It will be remembered that the values $U_L$ and $U_R$ are those of the unbalance to be determined in the left and right bearing planes respectively. It will be understood therefore that by the combination or computation of voltages according to the principles outlined above, the output voltages, corresponding to vectors $U_R$ and $U_L$, are directly indicative of the unbalance magnitudes to be determined although, as explained, no calibrating trial run is used.

How the above-presented vectorial and voltage relationships are produced and automatically processed will presently be explained with reference to the examples of the illustrated machinery and circuitry.

According to FIGS. 3 and 4, the bed plate of a balancing machine carries two bridge members 40a and 40b in which the bearings 30a and 30b for the shaft ends of the rotor 1 are mounted. Each bridge structure is equipped with two pairs of leaf springs 33—34 and 37—38 which are interconnected by a rigid bar 35a or 35b. The bottom ends of leaf springs 37 and 38 are rigidly attached to an upward projection 36 of the bridge member 40. The top ends of leaf springs 33 and 34 are interconnected by a rigid bar member 30c carrying the appertaining rotor bearing. The two pairs of supporting springs are placed at an angle to each other so that the rotor, when rotating in the bearings 30a and 30b is capable of performing vertical as well as horizontal oscillations due to unbalance of the rotor.

The vertical oscillatory motions of bearing 30a are transmitted through a feeler rod 39 to the transducer T1 (FIG. 4). Vertical oscillation of bearing 30b (FIG. 3) is transmitted to transducer T3. Horizontal oscillations of the bearings are transmitted by respective feeler rods 42 (FIG. 4) to respective transducers T2 and T4. All transducers may consist of electrodynamic pickups, for example. Located diametrically opposite the transducers T2 and T4 are respective oscillation exciters EXa and EXb. Each exciter is connected with the bearing bridge structure 40a or 40b by a mounting strip 43a and a leaf spring 43 and coupled with the bearing 30a or 30b by a connecting rod 46. The exciters provide the above-mentioned additional oscillations which become superimposed upon the unbalance-responsive oscillations of the rotating workpiece and which are predetermined with respect to magnitude, direction and frequency.

The rotor 1 is driven from an electric motor AM through a Cardanic shaft K and also drives a phase reference generator 60, for example a dynamo, which provides two sinusoidal voltages 90° phase displaced from each other. The particular type and operation of the auxiliary exciters is not essential to the invention. For example, each exciter may consist of an electric motor which drives an unbalanced flywheel and can be driven at selectively adjustable speed (FIG. 10). In the embodiment of FIGS. 3 to 6, however, the exciters are of the electromagnetic type explained presently with reference to FIG. 5.

In FIG. 5 the mass M1 on a leaf spring 52 schematically represents the oscillatory mass of the composite structure 30a–30c on the springs 33, 34, 37, 38 in FIG. 4. The mass M2 on the spring 53 in FIG. 5 serves to represent the composite structure 43—43a—EXa in FIG. 4. The two masses M1 and M2 are coupled with each other through the electrically excitable, magnetic force of an exciter coil 51 which acts upon a magnetizable armature 51a of the exciter EXa. During operation, the unbalance force denoted by the vector 55 in FIG. 5 of the rotor journalled in the balancing machine (corresponding to vector $U_L$ or $U_R$ in FIG. 2) rotates about the rotor axis $a$ at the frequency of rotor rotation in the direction of the arrow 55a. The additional excitation by means of the electromagnetically operating coil 51 produces a reciprocating force indicated by a double-headed arrow 57. When the two forces 55 and 57 are in phase, they become added vectorially. The sum force is translated into electrical voltage by the oscillation-responsive transducer T2 (or T4) in FIGS. 3 and 4. If desired, the magnitude of this sum force can be indicated on a scale 56 (FIG. 5). The excitation of coil 51 in the exciter is effected either at the rotation frequency of the rotor or at a different frequency, but in the latter case the excitation frequency is preferably kept at a fixed ratio to the rotor frequency. In the preferred embodiment of FIGS. 3 to 7, the two exciters EXa and EXb are energized from the same generator 60 (FIGS. 3, 6) that furnishes the above-mentioned phase reference voltage so that the excitation is always at the rotor frequency or in a fixed ratio thereto regardless of changes in rotor speed.

Referring now to the circuit diagram of FIG. 6, it will be remembered that during a measuring run of a rotor workpiece, the phase reference generator 60 (FIGS. 3, 6) furnishes two alternating voltages 90° phase displaced from each other. These reference voltages are connected to a selector switch 60a which permits impressing them through the leads 61 and 62 upon two electric multiplier components 63 and 64, or upon two multipliers 65 and 66, depending upon whether the switch 60a is placed to position V or H. The alternating voltage from transducer T1 is supplied through leads 67 to the multiplier 65. The voltage from transducer T2 is supplied through leads 68 to the multiplier 63. The voltage of transducer T3 is applied by leads 69 to multiplier 66, and the voltage of transducer T4 through leads 70 to multiplier 64.

The multiplier 65 furnishes in its output circuit 76 a voltage proportional to the product of the T1 transducer voltage times the reference voltage impressed upon the two respective input circuits 67 and 62. This output voltage is amplified in an amplifier 78. The multiplier 66 analogously furnishes an output voltage proportional to the product of the T3 transducer voltage and phase reference voltage impressed upon the two input circuits, and this multiplier output voltage is amplified in an amplifier 79.

The four multiplier components 63 to 66 are preferably of the same design and performance, the particular computer type being not essential to the present invention.

For simplicity of illustration, one of the multiplier components, the unit 66, is shown to be of the Hall-generator type, mainly because this particular type of multiplier can readily be illustrated by a simple circuit diagram in a single plane of illustration. The multiplier 66, as exemplified in FIG. 6, comprises a semiconductor wafer 66a (Hall plate) traversed by current due to reference voltage from the phase reference generator 60. The Hall plate, consisting for example of indium antimonide (InSb), is located in the field of a magnet coil 66b, the field axis extending substantially perpendicular to the plane of the plate. The field coil is energized by the second input voltage, namely by the voltage from pickup T3. The Hall plate 66a has two probe electrodes across which an output voltage appears, this voltage being proportional to the product of the two input voltages. As mentioned, the multipliers 63, 64 and 65 may have the same design and performance. This also applies to the multiplier units 96 and 104 described further below.

The phase reference generator 60 is also connected through amplifiers 72 and 73 with the coils 51 of the respective exciters EXa and EXb (FIG. 3) so that in this embodiment the exciters operate in synchronism and phase coincidence with the workpiece rotation. The amplifier units 72 and 73, as well as those denoted by 78 and 79, may all be identical in design and performance. They are shown to have the output circuit of the amplifier proper connected to a transformer 74, 75 with two mutually isolated secondary windings. In amplifier units 72 and 73, the exciter coils 51 are connected to one of these secondary windings respectively.

As mentioned, the output voltages of multiplier units 65 and 66 are amplified in amplifiers 78 and 79. Each of these amplifiers has an output circuit connected to a transformer with two mutually isolated secondary circuits as shown for unit 79. A lead 80 connects one secondary circuit of amplifier unit 78 with the input terminals of a quotient computer or divider 84 in voltage-opposed series relation to the output of multiplier unit 63 so that, relative to the divider unit 84, the multiplier output voltage and the amplifier output voltage are differentially related to each other. The amplifier 78 is further connected by a lead 81 and through a rheostat PEL with the other secondary winding of transformer 74 in amplifier 72. The connection of lead 81 with the circuit of rheostat PEL is in the sense required to impress upon the input circuit of the divider unit 84 a resultant difference voltage that corresponds to the voltage from transducer T2 minus the voltage from transducer T1 minus the excitation voltage, corresponding to Equation 3 presented above.

Another divider unit 89 is analogously connected with the multiplier 64, the amplifier 79 and a rheostat PER in the circuit of the second secondary winding of transformer 75 and amplifier 73. This connection comprises a lead 85 which connects one of the two output circuits of amplifier 79 with the output circuit of the multiplier 64, and a lead 86 which connects the same output circuit of amplifier unit 79 through the adjusting rheostat PER to the transformer 75 for the excitation voltage of the other exciter EXb. Consequently the input circuit of the divider unit 89 receives a difference voltage between leads 87 and 88 which corresponds to the voltage from pickup T4 minus the voltage from pickup T3 minus the exciter voltage $E_R$, corresponding to Equation 4. The above-mentioned voltage from transformer 74 and amplifier 72, adjusted by rheostat PEL, is also impressed upon the second input circuit of the divider unit 89 through leads 90 and 91. Thus the output circuit 102, 103 furnishes a voltage proportional to the quotient $E_L/(T_4-T_3-E_R)$.

Through leads 92 and 93 the voltage corresponding to the value $E_R$ and furnished from transformer 75 and amplifier 73 through rheostat PER reaches the quotient-forming unit 84, so that the output circuit 94, 95 of this unit furnishes a voltage proportional to the quotient $E_R/(T_2-T_1-E_L)$.

The type, design and details of the quotient-forming components 84 and 89 are not essential to the invention proper, any electrically operating computer devices of the ratio-forming types being applicable. For convenience, however, one of the two units, the unit 84, is separately shown in FIG. 7 with respect to its internal circuitry, a Hall-generator device being chosen because of the simplicity with which it can be illustrated in a single plane of illustration. The particular unit corresponds to the one described and explained in Siemens Zeitschrift (German periodical) of September 1954, page 7, or in U.S. Patent No. 3,003,698.

Figure 7:
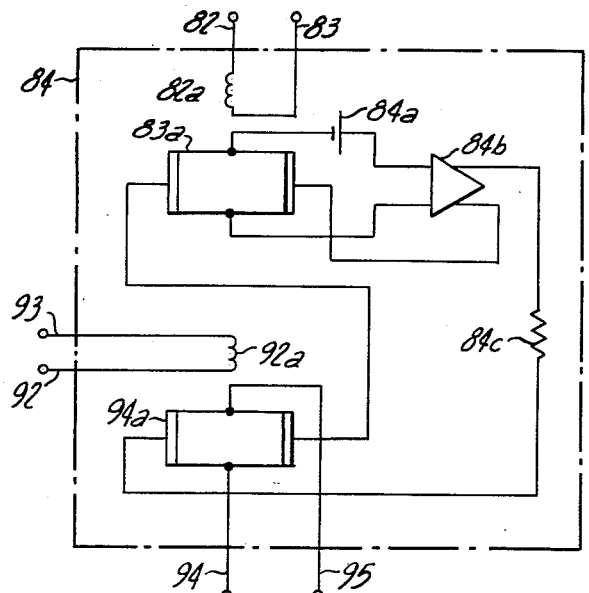
FIG. 7 shows a detail of the circuit according to FIG. 6.

The quotient-forming device shown in FIG. 7 is essentially a combination of two Hall generators, each being essentially a multiplying component. One input signal from leads 82 and 83 is applied to a magnetic field coil 82a to act upon a semiconductor Hall plate 83a which extends perpendicular to the field axis. The output taken from the probe or Hall electrodes of the Hall plate 83a is connected in series with a constant voltage from an auxiliary source 84a, and the resultant voltage is amplified in a regulating amplifier 84b. The amplifier output passes in series through a resistor 84c, the Hall plate 83a and through another Hall plate 94a which extends perpendicular to the field axis of another magnet coil 92a energized from the leads 92 and 93 of the second input circuit. The current passing through the Hall plate 94a represents the reciprocal value of the voltage applied between input leads 82 and 83, so that the output voltage between leads 94 and 95 is the product of the voltage between leads 92 and 93 divided by the voltage between leads 82 and 83. For further explanation reference may be had to the above-mentioned literature and patent.

Reverting to FIG. 6, the quotient voltage from divider unit 84 is applied through output leads 94, 95 to another multiplier unit 96, whose second input circuit 97, 98 receives a voltage corresponding to the value $U_R$. By means of leads 99, 100 constituting the second output circuit of amplifier 78, a voltage corresponding to the voltage value T1 is subtracted from the original output voltage of the multiplier unit 96. Consequently a measuring instrument 101 connected to the multiplier 96 and to the second output circuit of amplifier 78 receives a difference voltage corresponding to the unbalance $U_L$ to be determined.

The unbalance $U_R$ is automatically determined and indicated in an analogous manner. The quotient voltage formed in the unit 89 passes through leads 102, 103 to a multiplier unit 104, which, like the unit 96, corresponds to the multiplier unit 63 to 66 described previously. The voltage corresponding to the unbalance to be determined is supplied from leads 105 and 106 to the second input circuit of the multiplier unit 104. By means of leads 107 and 108, constituting the second output circuit of the amplifier unit 79, an amount corresponding to the pickup voltage T3 is subtracted, and the differential result is impressed upon a measuring instrument 109 which indicates the unbalance magnitude $U_R$.

The above-described measuring performance requires that the selector switch 60a be placed from the illustrated inactive position into one of the active positions V or H. When the switch 60a is in position V, the instrument 101 indicates the amount $U_Lv$, i.e. the "vertical" component of the unbalance value in the plane of the left rotor bearing (30a in FIG. 3), and the instrument 109 simultaneously indicates the amount $U_Rv$, i.e. the vertical component of unbalance in the plane of the right rotor bearing (30b in FIG. 3), both component unbalance values being directly indicated in the desired scale units, such as cm.-g., for which the instruments are calibrated. Thereafter the switch 60a is placed into position H. Now the instruments 101 and 109 directly indicate the unbalance amounts $U_Lh$ and $U_Rh$, i.e. the horizontal components of unbalance in the planes of the left and right rotor bearings respectively.

The above-described measuring method determines the unbalance of the rotor workpiece in each reference plane by ascertaining and indicating the unbalance in the form of two coordinated components. Instead of measuring unbalance by such (Cartesian) coordinates, substantially the same machine and substantially the same electrical system are also applicable for measuring unbalance or the known polar coordinate principle. For this purpose, the phase-reference generator 60 (FIGS. 3, 6) is given a rotatably mounted stator whose angular position indicates the angular position of the unbalance relative to a given reference radius of the rotor when the instrument indication, by turning the stator, is set to zero or minimum. If the current from the same phase reference generator 60 controls the coil 51 of the exciters EXa and EXb, as is the case in FIG. 6, the horizontal component of unbalance is adjusted to the zero value so that relative to the vertical component the rotor unbalance and the additional excitation are in phase with each other. In that case the deflection of the instruments 101 and 109 indicates the magnitude of the unbalance when the stator of the phase reference generator is set to the just-mentioned zero position.

It will be understood that the measuring results obtained in accordance with the invention involve an accurate "plane separation" of the type heretofore obtained by potentiometric networks. The plane-separated measuring values obtained by virtue of the invention can be referred to any desired correction plane or location of the workpiece in the conventional manner, similar to the one employed with balancing machines operating at subcritical speed of workpiece rotation. For example, the transfer of the forces from the bearing planes to the correction planes can be effected by devices as known from French Patent 1,207,643. The measuring instrument 101 and 109 may also be calibrated directly in grams or ounces of correcting weight to be applied.

Figure 8:
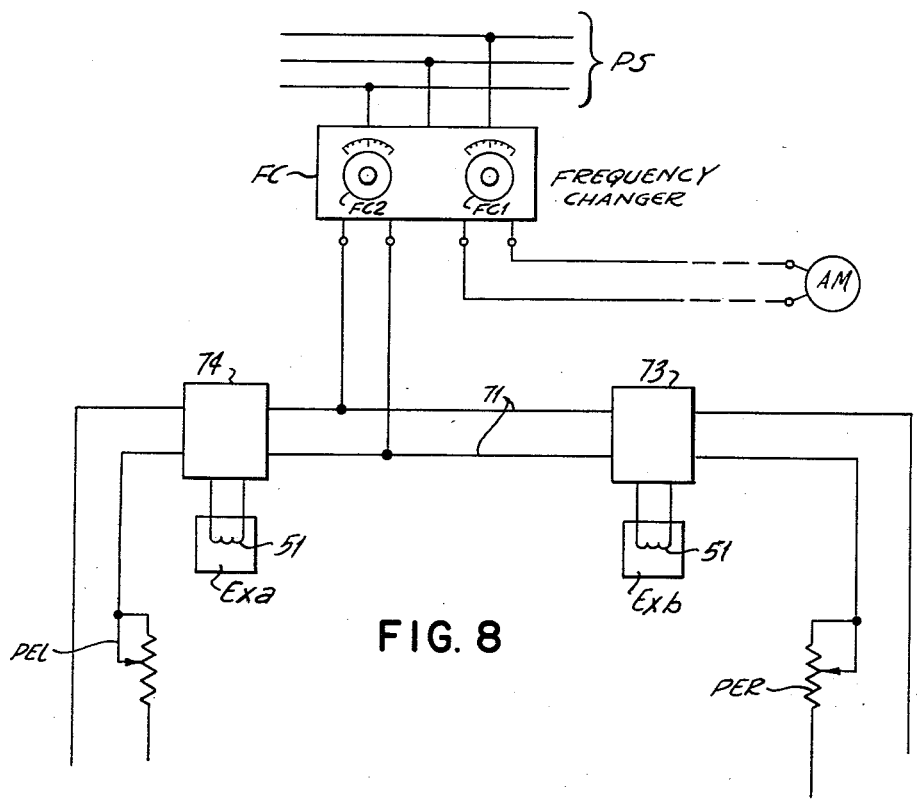
FIG. 8 shows a modified portion of a circuit diagram otherwise corresponding to that of FIG. 6.

As mentioned, the exciters EXa and EXb need not be energized from the phase reference generator 60 but may receive energizing current from any other suitable alternating-current source. For example, and as schematically shown in FIG. 8, the electric motor AM (FIG. 3) as well as the coil 51 of each exciter can be energized from a frequency changer FC, connected to a power supply line PS, which simultaneously furnishes two voltages of respectively different frequencies adjustable at FC1 and for the motor AM and at FC2 for the exciters EXa, EXb. During operation, one of the transducers, for example transducer T2 in FIG. 4, then furnishes a voltage dependent upon the superimposed excitation forces. By multiplying this T2 voltage with phase reference voltage from the phase transmitter 60 (FIGS. 3, 6) rotating in synchronism with the rotor, there is obtained a product voltage equivalent to the unbalance. When the transducer voltage is simultaneously multiplied with the voltage furnished from the frequency changer FC for excitation of the exciter coils 51, then there appears at the output of the multiplying component (63—66 in FIG. 6) a voltage equivalent to the excitation. After forming the quotient (components 84, 89 in FIG. 6) the unbalance can be indicated in an instrument, for example on a linear scale in a desired measuring unit, for example in cm.-g. (component 101 for $U_L$ and 109 for $U_R$), in the same manner as described above with reference to the preceding embodiment.

If the measuring run of a rotor is to comprise rotating speeds at which bendingly elastic deformation or the like distortions may occur, then the indication obtained with the balance measuring methods heretofore available varies in dependence upon the rotating speed. It has therefore been difficult to separate the effect of unbalance from the effect of elastic deformation with respect to the measuring results. When employing the invention, however, the rotation frequency of the rotor and the frequency of the additional excitation always maintain a fixed ratio or can readily be so varied that the same frequency ratio remains maintained. This results in an unbalance indication independent of the rotating speed.

Balancing systems according to the invention can be modified in various other respects. Thus the forces of the exciters EX$a$ and EX$b$, which generate the vectors $E_L$ and $E_R$ can be arranged, as diagrammatically represented in FIG. 9, in accordance with their distances $a$ and $b$ from the respective correction planes CPL and CPR or correction locations of the workpiece, and relative to the distance $d$ of the measuring locations E2$a$ and E2$b$ from each other, so that in this manner a resultant excitation effect $E_R$ is obtained as it would be produced by only one exciter if this single exciter were active in a selected one of the correction planes. The diagram of FIG. 9 relates to the case in which a single resultant excitation $E_R$ is thus produced in the correction plane CPR of the workpiece 1.

A balancing machine affording such an adjustment of the exciters is schematically shown in FIG. 10, except that for simplifying the illustration a different elastic support of the rotor journal structure is shown, although the vertically and horizontally vibratory structure according to FIG. 4 is also applicable in the modified machine.

According to FIG. 10, a base plate 201 carries four round rod springs 202 which vibratorily support a rigid frame structure 203. The frame structure has two aligned notches 204 for journalling the shaft ends 205 of the rotor workpiece 201. Two exciter motors 206$a$ and 206$b$ are displaceably mounted on the rear end of the frame 203. Each of these motors drives an oscillation exciter of known power, for example a disc 45$a$ or 45$b$ with an unbalance weight 45$aa$ or 45$bb$. The unbalance of disc 45$a$ is 90° displaced to that of disc 45$b$, so that the effects of the simultaneously rotating discs can be ascertained separately from each other by multiplication.

Mounted on a wall 207 of the machine frame structure are two transducers, for example electrodynamic pickups, 208$a$ and 208$b$. The transducers generate electric voltages in dependence upon the oscillations of the frame 203 stemming from the unbalance of the workpiece 201' and also stemming from the operation of exciters 45$a$, 45$b$. The unbalances on discs 45$a$ and 45$b$ rotate in respective planes which coincide with the correction planes of the rotor 201.

When a new workpiece with different dimensions is placed into the frame structure 203, the exciters 45$a$ and 45$b$ are to be adjusted to the newly chosen correction planes or correction locations of this workpiece. For this purpose the frame 203 is provided with a transverse groove 209 extending parallel to the journal axis of the rotor determined by the alignment axis of the notches 204. The machine thus permits adjusting and fixing the locations of the two exciters so that each of them has in its own plane, i.e. in one of the two correction planes of the rotor, the same effect as would be produced by the two exciters in a machine as described above with reference to FIG. 3. In all other respects a machine in accordance with the principles of FIGS. 9 and 10 may be in accordance with the machine and circuitry described above with reference to FIGS. 3 to 7.

While the illustrated embodiments relate to a horizontal arrangement of the rotor during the balancing run, the invention is equally well applicable to balancing machines in which the rotor axis, during the balancing run, is vertical. In the latter case, the journal structures, such as the one shown in FIG. 4, are to be mounted 90° displaced.

It will be apparent from the foregoing, to those skilled in the art of rotor balancing, that my invention is amenable to a variety of modifications with respect to machine components, circuitry and electrical components and hence may be given embodiments other than particularly illustrated and described herein, without departing from the essential features of my invention and within the scope of the claims annexed hereto.

I claim:

1. The method of measuring unbalance of a rotor, which comprises rotating the rotor between two journal means each elastically deflectable in all directions within respective radial planes to obtain rotational oscillation of said structure due to unbalance of the rotor, superimposing upon the rotor an additional oscillatory excitation of known frequency and magnitude whereby additional oscillations are applied to said structure, separately sensing the oscillations of said structure in two coordinate directions in each of said planes and translating said oscillations into respective voltages, providing a phase reference voltage in synchronism and fixed phase relation with the rotor rotation, and electrically combining the voltages at each plane with each other and with a voltage corresponding to the additional oscillation and with the phase reference voltage to obtain two resultant voltages each dependent upon voltages from both planes and indicative of unbalance only in one plane.

2. The method of measuring unbalance of a rotor, which comprises rotating the rotor between two journal means each elastically deflectable in all directions within respective radial planes to obtain a rotational oscillation of said structure due to unbalance of the rotor, superimposing upon the rotor an additional oscillatory excitation of known frequency and magnitude in a given radial direction whereby additional linear oscillations are applied to said structure in said one direction, separately sensing the oscillations of said structure in two coordinate directions in each of said planes and translating said oscillations into respective voltages, providing a phase reference voltage in synchronism and fixed phase relation with the rotor rotation, and electrically combining in a subtractive relation in each plane the oscillation responsive voltages and a voltage corresponding to the additional excitation as well as the phase reference voltage to obtain a difference voltage, dividing the excitation voltage by the difference voltages in each plane to obtain two dividends, multiplying the dividend of each one plane by a factor from the other plane to obtain two resultant voltages indicative of the unbalance in each plane, said factors from the other plane comprising the resultant voltage of the other plane in differential relation with the voltage from one coordinate direction in the one plane.

3. The method of measuring unbalance of a rotor, which comprises rotating the rotor between two journal means each elastically deflectable in two mutually perpendicular coordinate directions of respective radial planes to obtain a rotational oscillation of said structure due to unbalance of the rotor, superimposing upon the rotor an additional linear oscillatory excitation of known frequency and magnitude in a direction coincident with one of said coordinate directions whereby additional oscillations are applied to said structure in said one direction, in each plane separately sensing the oscillations of said structure in said two coordinate directions and translating said oscillations into respective voltages of which the one corresponding to said one direction is due to said unbalance-caused oscillations as well as to said excitation-caused oscillations whereas the other voltage is due only to unbalance-caused oscillations, providing a phase reference voltage in synchronism and fixed phase relation with the rotor rotation, with the aid of said phase reference voltage in each plane comparing the separately sensed oscillations with each other to obtain the effect of said additional excitation voltage as a difference voltage, in each plane comparing the difference voltage with the actual excitation voltage so as to determine the effect of said additional excitation voltage on each plane, and in each plane adjusting the voltages corresponding only to the unbalanced-caused oscillations according to the effect of the excitation on the planes.

4. The method of measuring unbalance of a rotor, which comprises rotating the rotor between respective journal means each elastically deflectable in two mutually perpendicular coordinate directions of respective radial planes to obtain a rotational oscillation of said structure due to unbalance of the rotor, superimposing upon the rotor an additional oscillatory excitation of known magnitude in a direction coincident with one of said coordinate directions and at a frequency having a fixed ratio relative to the rotation frequency of the rotor, in each plane separately sensing the oscillations of said structure in said two cordinate directions and translating said oscillations into respective voltages of which the one corresponding to said one direction is due to the sum of said unbalance-caused oscillations plus said excitation-caused oscillations whereas the other voltage is due only to unbalance-caused oscillations, providing a phase reference voltage in synchronism and fixed phase relation with the rotor rotation, with the aid of said phase reference voltage in each plane comparing the separately sensed oscillations with each other to obtain the effect of said additional excitation voltage as a difference voltage, in each plane comparing the difference voltage with the actual excitation voltage so as to determine the effect of said additional voltage on each plane, and in each plane adjusting the voltages corresponding only to the unbalance-caused oscillations according to the effect of the excitation on the planes.

5. The method of measuring unbalance of a rotor, which comprises rotating the rotor between two journal means each elastically deflectable in two mutually perpendicular cordinate directions of a radial plane to obtain respective rotational vectorial oscillation of said structure due to unbalance of the rotor, superimposing upon the rotor at each journal means additional linear oscillatory excitations of known frequency and magnitude in a direction co-incident with one of said coordinate directions whereby additional oscillations are applied to said structure in said one direction, separately sensing the oscillations of said structure in each plane in said two coordinate directions and translating said oscillations into respective voltages of which the one corresponding to said one direction is due to the sum of said unbalance-caused oscillations plus said excitation-caused oscillations whereas the other voltage is due only to unbalance-caused oscillations, electrically forming a difference voltage from said two transducer voltages in each plane, providing a phase reference voltage in synchronism and fixed phase relation with the rotor rotation, comparing the difference voltages with the known excitation voltages, and combining the results with voltages from the other plane to obtain respective unbalance values in each plane depending upon voltages measured in both planes.

6. A balancing machine, comprising supporting structure, two journal means for rotatably accommodating a rotor to be tested for unbalance, said journal means being elastically mounted on said structure and oscillatorily deflectable relative thereto in all directions of a given reference plane, drive means for rotating the rotor in said journal means, oscillation exciter means coupled with said journal means for subjecting the rotor to oscillations of a given excitation frequency and magnitude in superposition to oscillations due to unbalance of the rotating rotor, two pairs of oscillation transducers mounted on said structure, each pair being coupled with one of said journal means for separate response to resultant journal oscillations in two different cordinate directions to produce respective transducer voltages, a source of phase reference voltage synchronous and in a fixed phase relation to the rotor rotation, and electric circuit means connected to said transducers and said source for combining said voltages to two separate resultant voltages each indicative of the unbalance of the rotor in one plane and dependent upon voltages originating in both planes.

7. A balancing machine, comprising supporting structure, two journal means for rotatably accommodating a rotor to be tested for unbalance, said journal means being elastically mounted on said structure and oscillatorily deflectable relative thereto in horizontal and vertical directions within a radial plane of the journal means, drive means for rotating the rotor whereby oscillations in said two directions are imposed upon said journal means due to unbalance of the rotor, oscillation exciter means coupled with said journal means for subjecting it to oscillations of given frequency and given magnitude in one of said directions and having voltage output means, two pairs of oscillation transducers mounted on said structure, one in each pair being responsive to horizontal and one to vertical oscillations of said journal means to produce respective transducer voltages, a source of phase reference voltage synchronous and in a fixed phase relation to the rotor rotation, two difference circuit means each connected to one pair of transducers and said voltage output means of said exciter means to produce two difference voltages, divider means connecting the difference voltage to the exciter voltage for producing two quotients, and two multiplier means each having two inputs and an output indicative of unbalance, one input of each being connected to respective divider means, the other input of each being connected to the output of the other and to the exciter voltage.

8. In a balancing machine according to claim 7, said journal means comprising a rotor bearing, two pairs of leaf-spring members supporting said bearing on said structure, the two members of each pair being horizontally spaced and parallel to each other and extending vertically adjacent to the respective members of the other pair and at an angle thereto, whereby said rotor bearing is capable of horizontal and vertical deflection relative to said structure.

9. In a balancing machine according to claim 7, said exciter means comprising an electromagnetic oscillation generator having a fixed frequency ratio to the rotor rotation.

10. In a balancing machine according to claim 7, said exciter means comprising an electromagnetic oscillation generator, and energizing circuit means connecting said oscillation generator with said reference-voltage source, whereby said exciter means operates at a frequency dependent upon that of the rotor rotation.

11. A balancing machine according to claim 7, comprising a frequency changer having two feeder circuits whose voltages have different respective frequencies adjustable relative to each other, circuit means connecting one of said feeder circuits with said drive means for rotating the rotor at one of said frequencies, the other of said feeder circuits being connected to said exciter means for producing oscillations of the other frequency.

12. In a balancing machine according to claim 6, said electric circuit means comprising electric multiplier and electric quotient-forming units responsive to said three voltages for producing said resultant voltage.

References Cited in the file of this patent

UNITED STATES PATENTS

| | | |
|---|---|---|
| 2,315,578 | Baker | Apr. 6, 1943 |
| 2,722,830 | Federn et al. | Nov. 8, 1955 |
| 2,851,885 | Federn et al. | Sept. 16, 1958 |